United States Patent Office 3,480,678
Patented Nov. 25, 1969

3,480,678
PREPARATION OF ACETALS OF
5-OXOPENTANALS
John G. Thweatt, Kingsport, Tenn., assignor to Eastman Kodak Company, Rochester, N.Y., a corporation of New Jersey
No Drawing. Filed June 27, 1967, Ser. No. 649,133
Int. Cl. C07c 45/00, 49/06, 43/30
U.S. Cl. 260—594       4 Claims

ABSTRACT OF THE DISCLOSURE

A novel ring-opening reaction of 6-alkyl- or 6-aryl-2-alkoxy-3,4-dihydro-2H-pyrans with alcohols in the presence of acid catalysts yields acetals of 5-alkyl- or 5-aryl-5-oxopentanals. Substituents such as alkyl or aryl may be present in other positions of the pyran component. The acetals of the invention are useful as intermediates for the preparation of aldehydes, mono- and dibasic acids and cyclic ketones employed in the manufacture of many commercial products.

---

This invention relates to a novel process for preparing ketoacetals, more particularly acetals of 5-oxopentanals, by treating an olkoxydihydropyran with an alcohol in the presence of an acid catalyst.

The production of substituted tetrahydropyrans by acid catalyzed addition reactions between dihydropyrans and nucleophilic reagents such as alcohols, phenols, mercaptans, amines and the like, are well known. Such reactions are, for example, disclosed in Houben-Weyl, Methoden der Organischen Chemie, vol. VI, part 4, pp. 364–385, and in other publications. So far as can be determined, all known examples of reactions of simple dihydropyrans with alcohols involve addition to the double bond only. As shown below, for example, 3,4-dihydro-2H-pyran reacts with methyl alcohol to give 2-methoxytetrahydropyran:

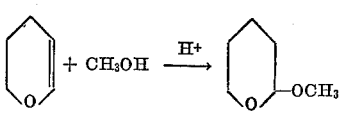

Alkoxydihydropyrans have also been reported to react with alcohols to yield the products of simple addition to the double bond, as for example, the reaction between 3,4-dihydro-2-methoxy-2H-pyran and methyl alcohol to give 2,6-dimethoxytetrahydropyran.

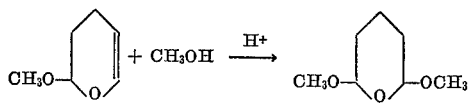

Several examples of this type of addition reaction are given in Houben-Weyl Methoden der Organischen Chemie, vol. VI, part 4, pp. 395, 396 and the references cited therein. These citations provide additional support for the unexpected nature of the ring opening reaction to be described hereinafter as the novel feature of this invention.

So far as is known, there is only one reference in the literature to a reaction involving ring opening of an alkoxydihydropyran in the course of reaction with an alcohol. This is the reaction of 2-methoxy-3,4-dihydro-2H-pyran with excess allyl alcohol, as described by C. W. Smith, D. G. Norton and S. A. Ballard, J. Am. Chem. Soc., 74, 2018 (1952), who obtained the tetraallyl acetal of glutaraldehyde as a by-product along with the desired 2,6-diallyloxytetrahydropyran as indicated by the following equation:

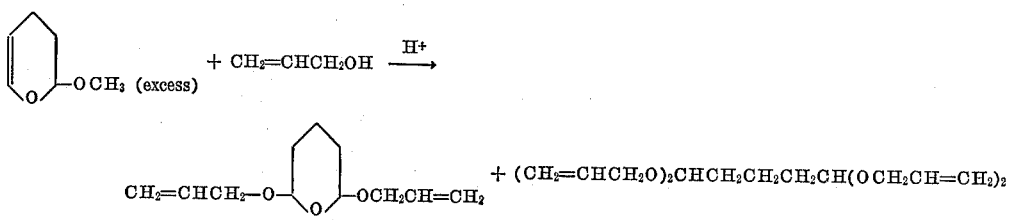

It is obvious from the description that follows that this type of ring opening is an entirely different reaction from that involved in the process of the instant invention since the product is the tetraallyl acetal, and not a ketoacetal. Furthermore, a reaction analogous to that described hereinafter would lead instead to a formylacetal having one of the following structures, such as:

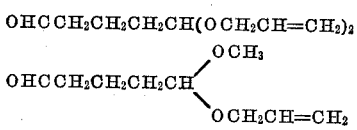

In addition it may be pointed out that allyl alcohol is an unusually reactive compound and for that reason undergoes many reactions which are not common to the simple saturated alcohols employed in the instant process.

This invention has as an object to provide new and useful compositions of matter which are ketoacetals typified by 3,7-dimethyl-5-oxooctanal diethylacetal, 5-oxohenanal diethyl acetal and other related ketoacetal compounds.

Another object is to provide a process for producing such ketoacetals by a reaction which involves a novel opening of the ring structure in an alkoxydihydropyran in reaction with an alcohol.

Other objects will appear hereinafter.

These and other objects are attained by the following invention, which, contrary to what would be expected from consideration of the above mentioned single known example of the ring opening of an alkoxydihydropyran in reaction with an alcohol, is based upon the discovery that an alkoxydihydropyran ring can be opened in reaction with an alcohol if the reaction is carried out in the presence of an acid catalyst under controlled conditions, and only if one employs as the alkoxydihydropyran a 2-alkoxy-3,4-dihydro-2H-pyran having a substituent other than hydrogen in the 6-position. In accordance with the invention, the reaction proceeds as shown in the following illustrative equation:

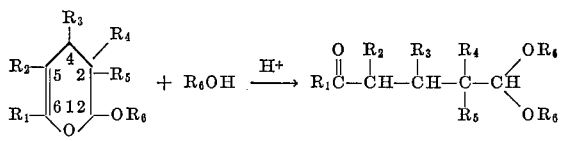

wherein $R_1$ may not be hydrogen but may be an alkyl or cycloalkyl group containing up to 8 carbon atoms including methyl, ethyl, propyl, butyl, isobutyl, octyl, and cyclohexyl, an aryl or substituted aryl group including phenyl, naphthyl, paratolyl and the like, or an aralkyl group such as benzyl; $R_2$, $R_3$, $R_4$ and $R_5$, taken singly, may be hydrogen, alkyl or cycloalkyl groups containing up to 8 carbon atoms, aryl or substituted aryl groups or aralkyl groups; and wherein any two substituents, including $R_1$, when taken collectively with the carbon atom or atoms to which they are attached, form a carbocyclic ring of up to 8 carbon atoms; and wherein $R_6$ may be an alkyl or cycloalkyl group containing up to 8 carbon atoms or an aralkyl group such as benzyl.

Among preferred sub-groups of ketoacetals which can be obtained in accordance with the invention are products having the general structure of the compound appearing to the right of the above equation in which:

(a) $R_1$ and $R_3$ are lower alkyl groups, $R_2$, $R_4$ and $R_5$ are hydrogen and $R_6$ is a lower alkyl group.
(b) $R_4$, $R_5$ and $R_6$ are methyl.
(c) $R_1$ is aryl and $R_2$, $R_3$, $R_4$, $R_5$ and $R_6$ are hydrogen or alkyl groups.
(d) $R_1$ is isobutyl, $R_3$ is methyl, $R_6$ is an alkyl group and $R_2$, $R_4$ and $R_5$ are hydrogen.
(e) $R_1$ is a straight chain alkyl group, $R_6$ is an alkyl group and $R_2$, $R_3$, $R_4$ and $R_5$ are hydrogen.
(f) $R_1$ and $R_3$ are phenyl groups, $R_6$ is an alkyl group and $R_2$, $R_4$ and $R_5$ are hydrogen.

More specifically, the alkoxydihydropyrans which may be employed as starting materials for the practice of the invention are 2-alkoxy-3,4-dihydro-2H-pyrans having a substituent other than hydrogen in the 6-position. Other positions may be substituted with hydrogen or hydrocarbon groups. Although not limited thereto, the composition of typical compounds suitable for use in the invention is indicated in the following table:

COMPOUNDS SUITABLE AS ALKOXYDIHYDROPYRAN STARTING MATERIALS (Referred to the structural formula below)

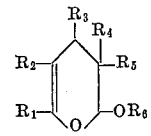

| $R_1$ | $R_2$ | $R_3$ | $R_4$ | $R_5$ | $R_6$ |
|---|---|---|---|---|---|
| Methyl | H | H | H | H | Ethyl |
| Methyl | H | H | H | H | 2-ethylhexyl |
| Methyl | H | Methyl | H | H | Methyl |
| Ethyl | Methyl | H | H | H | Butyl |
| Methyl | H | H | Methyl | H | Ethyl |
| Methyl | H | H | Methyl | Methyl | Methyl |
| Methyl | H | Isopropyl | H | H | Ethyl |
| Isobutyl | H | Methyl | H | H | Benzyl |
| n-Octyl | H | H | Ethyl | H | 2-methylpentyl |
| n-Octyl | n-Heptyl | H | H | H | Methyl |
| Isobutyl | H | n-Hexyl | H | H | Ethyl |
| Benzyl | H | H | Propyl | H | Butyl |
| Phenyl | H | Methyl | H | H | Cyclohexyl |
| Methyl | H | Phenyl | H | H | Ethyl |
| Methyl | H | 1-ethylpropyl | H | H | Ethyl |
| Butyl | Propyl | Propyl | H | H | n-Octyl |
| Methyl | H | H | Butyl | Ethyl | Methyl |
| Methyl | H | Benzyl | Methyl | H | Ethyl |
| Phenyl | H | Phenyl | H | H | Ethyl |
| Methyl | Propyl | H | Ethyl | H | Butyl |
| Methyl | H | H | $R_4+R_5=(-CH_2-)_5$ | | Butyl |
| $R_1+R_2=(CH_2)_4$ | | H | H | H | Isobutyl |
| Cyclohexyl | H | Methyl | H | H | Isobutyl |
| Methyl | H | Cyclohexyl | H | H | Ethyl |

The alcohols which may be employed in accordance with the invention are alcohols such as methyl, ethyl, n-butyl, n-octyl, isobutyl, 2-ethylhexyl, benzyl, cyclohexylmethyl, isopropyl, cyclohexyl, and t-butyl alcohols. All of these compounds are satisfactory reactants and provide suitable alkoxy substituents in the alkoxydihydropyrans.

Various acid catalysts may be employed. These may be, for example, any acid having an acid dissociation constant of $10^{-5}$ or greater. However, the reaction proceeds most rapidly with strong acids such as paratoluenesulfonic acid, sulfuric acid, hydrogen chloride, etc. On the other hand, the use of a weaker acid such as phosphoric acid offers the advantage that the ketoacetals are stable in the presence of weak acids, while they will undergo further reactions when heated in the presence of strong acids. Thus, suitable catalysts for the reaction include inorganic acids such as sulfuric, hydrochloric, perchloric, phosphoric, and phosphorous acids; organic acids such as p-toluenesulfonic, picric, formic, acetic, butyric, isobutyric, 2-ethylhexanoic, benzoic, naphthoic, chloroacetic, trichloroacetic, trifluoroacetic, fumaric, barbituric and nicotinic acids; salts of weakly basic amines such as aniline hydrochloride, naphthylammonium sulfate, and quinoline hydrochloride; and Lewis acids such as aluminum chloride, boron trifluoride, ferric chloride, and zinc chloride.

It is vital to the successful operation of the process that the acid catalyst be neutralized under anhydrous conditions before recovery of the ketoacetal product by distillation of the reaction mixture is attempted. Otherwise reversal of the reaction takes place along with other side reactions and very little of the desired ketoacetal is obtained.

The process of the invention is most readily carried out at temperatures of 25–40° C. by simply mixing the reactants and allowing the mixture to warm itself spontaneously. The process may, however, be operated at much lower temperatures, (e.g. —20°–10°), by providing for external cooling, or up to the reflux temperature of the alcohol reactant. A practical operating temperature may, for example, range from —20° C. to 80° C. when employing ethyl alcohol as the alcohol reactant. However, temperatures up to 200° C. may be employed, the specific temperature in any given instance depending, as stated on the reflux temperature of the specific alcohol reactant, and on whether or not super-atmospheric pressures are employed.

The process may be operated at atmospheric pressure. However, super-atmospheric pressures may be used to increase the reaction temperature, or reduced pressure may be used if operation under reflux is desired at temperatures below the atmospheric boiling point of the reaction mixture.

In the following examples and description I have set forth several of the preferred embodiments of my invention, but they are included merely for purpose of illustration and not as a limitation thereof.

Example 1

A mixture of 297 g. (1.5 mole) of 2-ethoxy-3,4-dihydro-6-isobutyl-4-methyl-2H-pyran, 600 g. (13 moles) of ethyl alcohol and 0.1 g. of p-toluenesulfonic acid is allowed to stand for 4 hrs. Within a few minutes after mixing the temperature rises to 30° C. but soon subsides. By gas liquid chromatography almost all of the dihydropyran will have reacted. The catalyst is neutralized by adding an excess of solid sodium carbonate to the mixture and allowing it to stand overnight. The mixture is filtered and distilled to give, after removal of ethyl alcohol and 16 g. of low boilers, 311 g. (85%) of 3,7-dimethyl-5-oxooctanal diethyl acetal, B.P. 118–121° C./5 mm., $n_D^{20}$ 1.4300.

*Analysis.*—Calcd. for $C_{14}H_{28}O_3$: C, 68.8; H, 11.6. Found: C, 69.1; H, 11.6.

The following equation represents the reaction involved:

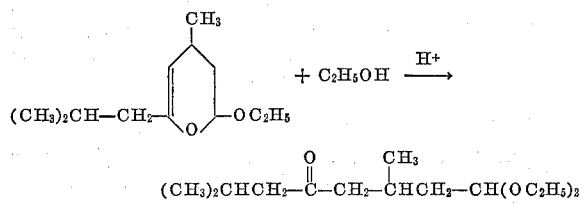

Example 2

A mixture of 5.0 g. of 2-ethoxy-6-isobutyl-4-methyl-3,4-dihydro-2H-pyran, 10.0 g. of absolute ethanol and 0.10 g. of glacial acetic acid is allowed to stand at room temperature for 12 days. A sample is then removed and neutralized by shaking with solid sodium carbonate. Analysis by gas liquid chromatography indicates that the mixture contains, besides excess ethanol, about 50% starting pyran, about 35% 3,7 - dimethyl-5-oxooctanal diethyl acetal and about 15% of minor components. When the reaction mixture is heated at reflux for 8 hrs., the pyran is completely consumed. Examination of the neutralized reaction mixture by gas-liquid chromatography shows that 3,7-dimethyl-5-oxooctanal diethyl acetal comprises about 90% of the mixture exclusive of unreacted ethanol.

Example 3

A solution of 7.5 g. of 3,4-dihydro-2-ethoxy-6-methyl-2H-pyran in 20 g. of absolute ethanol is treated with 75 mg. of p-toluenesulfonic acid. The temperature of the mixture rises spontaneously to 37° C. in about 2 min. When the temperature of the mixture drops back to room temperature, 10 g. of solid sodium carbonate is added, and the mixture is shaken well. The mixture is filtered, and the excess ethanol is removed at reduced pressure to yield 8.1 g. of light yellow oil. The product as shown by gas-liquid chromatography consists of one major component with 2–3% each of three impurities and with no starting material detected. Infrared and NMR spectra of the product support the assignment of its structure as 5-oxohexanal diethyl acetal. The equation for this reaction is as follows:

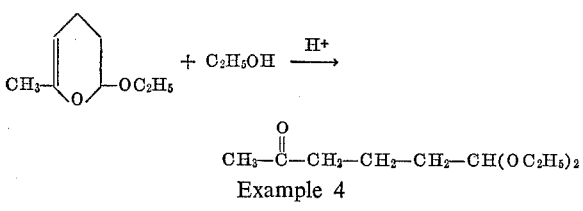

Example 4

A solution of 29 g. of 3,4-dihydro-2-ethoxy-(1-ethylpropyl)-6-methyl-2H-pyran in 60 ml. of absolute ethanol is treated with 0.30 g. of p-toluenesulfonic acid. After the mixture stands at room temperature for 2 hrs., it is shaken well with 3.0 g. of solid sodium carbonate. Examination by gas-liquid chromatography shows the starting pyran to have been converted almost completely to a mixture of two components, which are difficult to separate by distillation on a small scale. However the higher boiling components can be separated from the last distillation cut by preparative gas-liquid chromatography and is shown to be 5-oxo-3-(1-ethylpropyl)hexanal diethyl acetal by its infrared and NMR spectra.

Example 5

A solution of 52.5 g. (0.24 mole) of 3,4-dihydro-2-ethoxy-6-methyl-4-phenyl-2H-pyran (which contains the isomeric 5-oxo-3-phenyl-1-hexen-1-yl ethyl ether) in 105 g. of absolute ethanol is treated with 0.50 g. of p-toluenesulfonic acid. A mild exotherm will be noted over a period of about 0.5 hr. Neutralization of a small sample and analysis by gas-liquid chromatography show that all the pyran reacts while small amounts of the cis-trans isomers of the unsaturated ether remain. After 2.5 hrs. reaction time the mixture is treated with 25 g. of solid sodium carbonate and allowed to stand at room temperature for 3 days. The solids are removed by filtration and the excess ethanol is distilled at 80 mm. pressure. Distillation of the residue through a 20 cm. Vigreux column yields 47 g. of 5-oxo-3-phenylhexanal diethylacetal, B.P. 130–137° C. at 1 mm., $n_D^{20}$ 1.4892. The following equation represents the reaction:

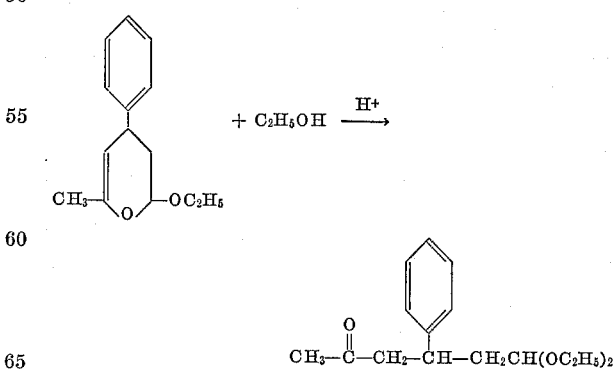

Example 6

A solution of 5 g. of 3,4-dihydro-2-ethoxy-4-isopropyl-6-methyl-2H-pyran in 10 g. of absolute ethyl alcohol is treated with 50 mg. of p-toluenesulfonic acid and the mixture heated at reflux for 5 min. The hot mixture is then treated with excess solid sodium carbonate. Analysis by gas-liquid chromatography shows that one component predominates in the reaction mixture. The mixture is combined with a similar mixture in which the catalyst is phosphoric acid and the crude product is distilled through an 8 cm. Vigreux column to yield 6 g. of 3-isopropyl-5-oxohexanal diethyl acetal, B.P. 97–112° at 2 mm.

Example 7

To a solution of 20 g. of 3,4-dihydro-2-methoxy-3,3,6-trimethyl-2H-pyran in 40 g. of anhydrous methanol is added 0.1 g. of p-toluenesulfonic acid. The temperature of the mixture rises quickly to 48° and then subsides. After one hour a sample is removed, shaken with solid sodium carbonate to neutralize the acid catalyst and examined by gas liquid chromatography on a Carbowax 20M column. The starting pyran is found to be completely converted to about equal amounts of two components. Isolation of the component having the longer retention time is carried out by preparative GLC, and it is shown to be 2,2-dimethyl-5-oxohexanal dimethyl acetal by its infrared, NMR and mass spectra.

Example 8

A solution of 20 g. of 2-ethoxy-3,4-dihydro-4,6-diphenyl-2H-pyran in 40 g. of absolute ethyl alcohol is treated with 0.2 g. of p-toluenesulfonic acid. A mild exotherm is observed over a period of about one hour. After standing-overnight at room temperature, the mixture is stirred well with 5 g. of solid sodium carbonate, filtered and distilled to remove excess ethyl alcohol. There remains 20.5 g. of light green, viscous oil. Examination of this residue by gas liquid chromatography on a Silicone SE-30 column indicates that it consists of about 90–95% of one component with 5–10% of impurities. The infrared and NMR spectra support the assignment of the structure as 3,5-diphenyl-5-oxopentanal diethyl acetal.

Example 9

A solution of 15 g. of 2-butoxy-3,4-dihydro-4-methyl-6-phenyl-2H-pyran in 30 g. of butyl alcohol is treated with 0.2 g. of boron trifluoride etherate. The mixture is allowed to stand overnight at room temperature, after which the catalyst is removed by shaking with 5 g. of a weakly basic ion exchange resin. After filtration and removal of solvent, the product is distilled to yield 12 g. of 3-methyl-5-oxo-5-phenylpentanal dibutyl acetal, B.P. 155–160° at 0.2 mm.

The following examples illustrate a number of uses of the compounds of the invention:

Example 10

A solution of 400 g. (1.64 moles) of 3,7-dimethyl-5-oxooctanal diethyl acetal and 0.5 g. of potassium hydroxide in 400 ml. of ethanol is hydrogenated over 50 g. of Raney nickel at 125° and 3000 p.s.i. The catalyst is removed and the ethyl alcohol is distilled, leaving 381 g. (95%) of 3,7-dimethyl-5-hydroxyoctanol diethyl acetal. The crude hydroxyacetal is acetylated by adding it to refluxing acetic anhydride containing 3% sodium acetate. The esterification mixture is added slowly to excess sodium carbonate solution with vigorous stirring. Separation of the organic layer yields 89% of 5-acetoxy-3,7-dimethyloctanal diethyl acetal.

A solution of 195 g. 5-acetoxy-3,7-dimethyloctanal diethyl acetal (prepared as described in the preceding paragraph) in 390 ml. of cyclohexane is passed at a rate of 1.1 ml./min. through a 2.4 x 30 cm. Vycor pyrolysis tube packed with Vycor chips which have been soaked in aqueous sodium hydroxide and washed well. During pyrolysis the temperature in the reactor is 440–505°. The reactor effluent is washed with aqueous sodium carbonate solution and with water, and the cyclohexane is distilled. Hydrolysis of the residue is effected by refluxing for 40 min. in aqueous 40% dioxane containing 1% hydrochloric acid. The 116 g. organic layer is separated, washed with dilute sodium carbonate and water, and combined with a cyclohexane extract of the aqueous layer. The combined organic solutions are reduced over 5% palladium on carbon catalyst at 25° and 40 p.s.i. until no further hydrogen is absorbed. After removal of catalyst, the mixture is distilled to yield 68 g. (64%) of 3,7-dimethyloctanal (tetrahydrocitral), B.P. 54–55° (2 mm.), $n_D^{20}$ 1.4264, which is an intermediate in the preparation of dihydro pseudoionone as described for example, in an article by Ping-Hsien Yeh (Taiwan Prov. Res. Inst., Formosa) Am. Perfumer Cosmet. 78 (2), 32–6 (1963), [Chemical Abstracts, vol. 59, column 3961 (1963)], which may be reduced to hexahydropseudoionone and converted, as described in Japanese Patent 10868 (1963), (Chemical Abstracts, 60, column 572), to isophytol which may be converted via phytol bromide to Vitamin E by reaction with trimethyl hydroquinone.

Example 11

Treatment of 2-ethoxy-6-ethyl-3,4-dihydro-2H-pyran with ethyl alcohol containing 0.5% sulfuric acid according to the procedure of Example 3 yields 5-oxoheptanal diethyl acetal of 90% purity. When the crude 5-oxoheptanal diethyl acetal is subjected to the reaction sequence described in Example 10; i.e., hydrogenation, acetylation, pyrolysis, hydrolysis and hydrogenation; the product is enanthaldehyde, B.P. 194–195°, $n_D^{20}$ 1.4254 (n-heptaldehyde), an article of commerce, useful for the production of heptanoic acid and heptyl alcohol.

Example 12

A solution containing 400 g. of 3,7-dimethyl-5-oxooctanal diethyl acetal (see Example 1), 250 ml. of ethyl acetate and 4.0 g. of sulfuric acid is heated 5 hrs. at reflux. The mixture is treated with 4.0 g. of sodium acetate to neutralize the acid catalyst and distilled to yield 204 g. (82%) of methenone, B.P. 81–82° (8 mm.), $n_D^{20}$ 1.4682. The methenone is reduced over 5% of its weight of Raney nickel. After filtration to remove the catalyst, the crude methonone-isomenthone mixture is distilled from 1% of its weight of sodium hydroxide using a 48" packed column with a liquid dividing head set at reflux ratio of 19:1. The distillate is 145 g. of para-menthone, B.P. 72° (6 mm.), and represents 70% conversion from the menthenone. The column holdup of 34 g. is a mixture of menthone and isomenthone and is added to a subsequent batch. Menthone is a GRAS (generally recognized as safe) flavoring. (Condensed Chemical Dictionary, seventh edition, p. 591).

Example 13

When 5-oxohexanal diethyl acetal (Example 3) is heated 4 hrs. at 85–90° with 1% of its weight of sulfuric acid, 2-cyclohexenone is obtained in 72% conversion. After the cyclohexenone is separated from ethyl alcohol and acid by washing with water and dilute sodium bicarbonate solution, it is reduced over a palladium catalyst to cyclohexanone, useful as a solvent for cellulose acetate, nitrocellulose, shellacs, varnishes and DDT (The Merck Index, seventh edition, p. 310). The cyclohexanone is oxidized with air and a cobalt catalyst or with nitric acid to adipic acid, which is useful in manufacturing Nylon 66, as well as other polyamide and polyester compositions.

As exemplified by the specific uses of the compounds of the invention set forth above, the ketoacetals of the present invention can be converted to aldehydes as described in the copending application of K. C. Brannock, H. E. Davis, and E. U. Elam, Ser. No. 649,122, filed on even date herewith, and now abandoned, and these aldehydes in turn may be converted to acids or alcohols, useful as solvents, intermediates for the preparation of synthetic lubricants and other products. When the $R_1$ group of the ketoacetal contains a methylene group adjacent to the carbonyl function, the ketoacetals may be converted by heating with strong acid catalysts to substituted cyclohexenones which may then be reduced to cyclohexanones. These substituted cyclohexanones may be oxidized to substituted adipic acids which in themselves are useful in the preparation of polyamide or polyester compositions by reacting the substituted acid with a diamine or a glycol.

Although the invention has been described in considerable detail with particular reference to certain preferred embodiments thereof, variations and modifications can be effected within the spirit and scope of the invention as described hereinbefore, and as defined in the appended claims.

I claim:
1. Process comprising reacting a 2-alkoxy-3,4-dihydro-2H-pyran of the formula

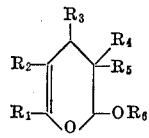

with an alcohol in the presence of an acid catalyst selected from the group consisting of an acid having an acid dissociation constant of $10^{-5}$ or greater, aluminum chloride, and boron trifluoride and obtaining a keto-acetal of the formula

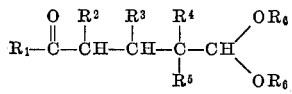

wherein:

$R_1$ is alkyl containing up to 8 carbon atoms, cyclohexyl, phenyl, tolyl or benzyl;

$R^2$, $R^3$, $R^4$ and $R^5$, taken singly, are each hydrogen, alkyl containing up to 8 carbon atoms, cyclohexyl, phenyl, tolyl, or benzyl;

$R_1$ and $R_2$, taken collectively, are 1,4-butylene;

$R_4$ and $R_5$, taken collectively, are 1,5-pentylene; and $R_6$ is alkyl containing up to 8 carbon atoms, cyclohexyl or benzyl.

2. Process according to claim 1 wherein the acid catalyst is hydrochloric acid, sulfuric acid, phosphoric acid or an organic acid having an acid dissociation constant of $10^{-5}$ or greater.

3. Process according to claim 1 wherein the acid catalyst is hydrochloric acid, sulfuric acid, phosphoric acid, or p-toluenesulfonic acid, $R_1$ and $R_3$ are each lower alkyl; $R_2$, $R_4$ and $R_5$ are each hydrogen; and $R_6$ is lower alkyl.

4. Process according to claim 1 wherein the acid catalyst is hydrochloric acid, sulfuric acid, phosphoric acid, or p-toluenesulfonic acid; $R_1$ is isobutyl; $R_3$ is methyl; $R_2$, $R_4$, and $R_5$ are each hydrogen; and $R_6$ is lower alkyl.

References Cited

UNITED STATES PATENTS

| | | | |
|---|---|---|---|
| 2,624,764 | 1/1953 | Emerson et al. | 260—590 |
| 2,931,837 | 4/1960 | Stansbury et al. | 260—345.9 |
| 3,287,372 | 11/1966 | Brannock et al. | 260—345.9 |

FOREIGN PATENTS 635,934    4/1950   Great Britain.

OTHER REFERENCES

Richter: Textbook of Organic Chemistry, p. 103 (1938), John Wiley and Sons, New York, N.Y.

Raphael et al.: Advances in Organic Chemistry, Methods and Results, vol. 3, 263–265 (1965).

DANIEL D. HORWITZ, Primary Examiner

U.S. Cl. X.R.

260—590, 591, 592, 586, 601, 530, 638, 345.5